B. TITUS.
BROOM CORN HARVESTER.
APPLICATION FILED JAN. 3, 1912.
1,034,044.
Patented July 30, 1912.
4 SHEETS—SHEET 4.
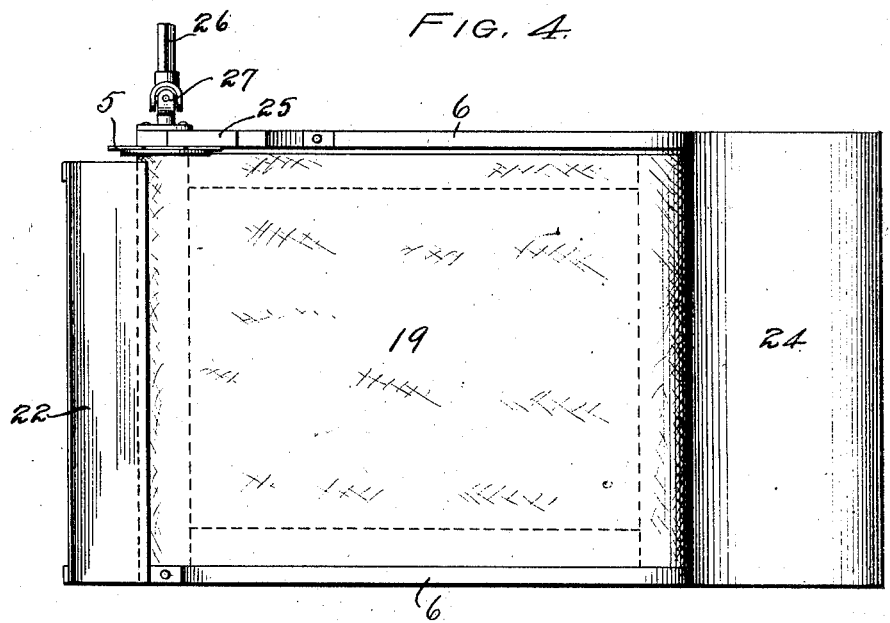
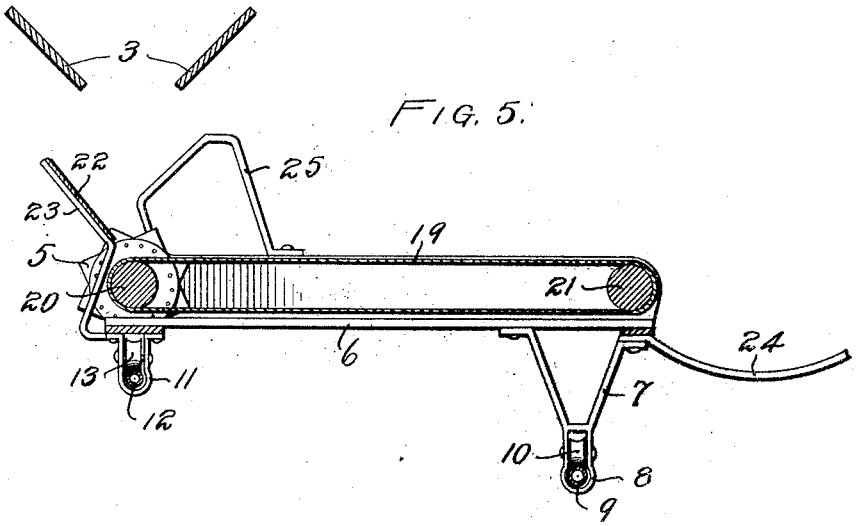
WITNESSES:
INVENTOR
Benjamin Titus
BY
His Attorney

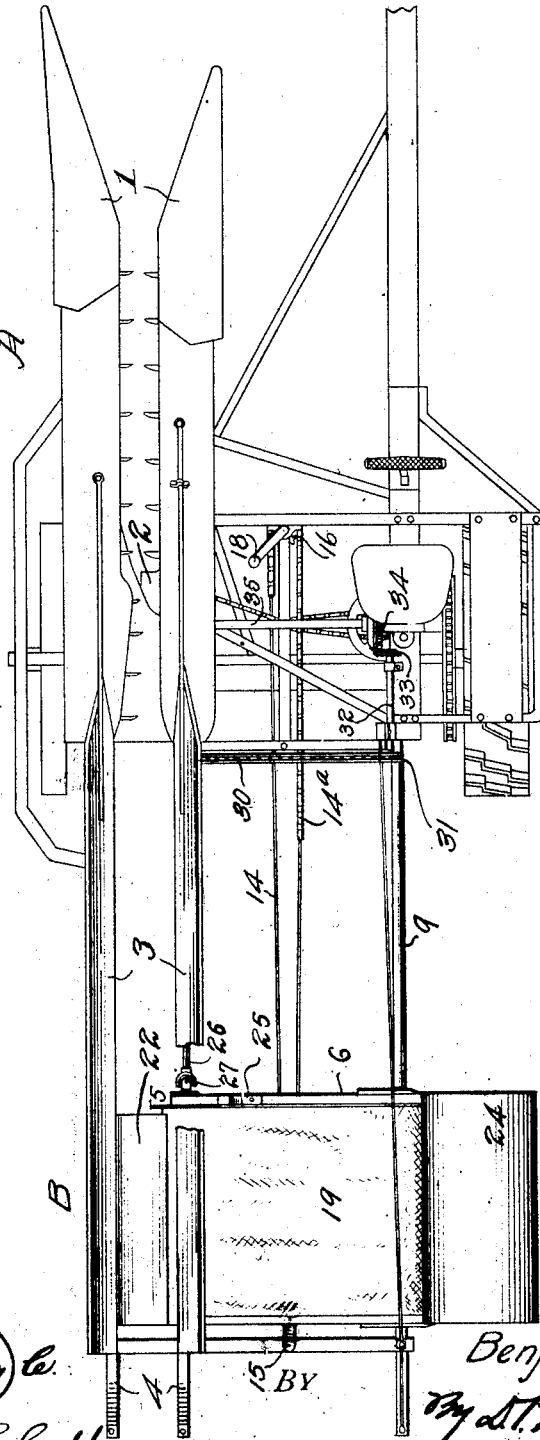

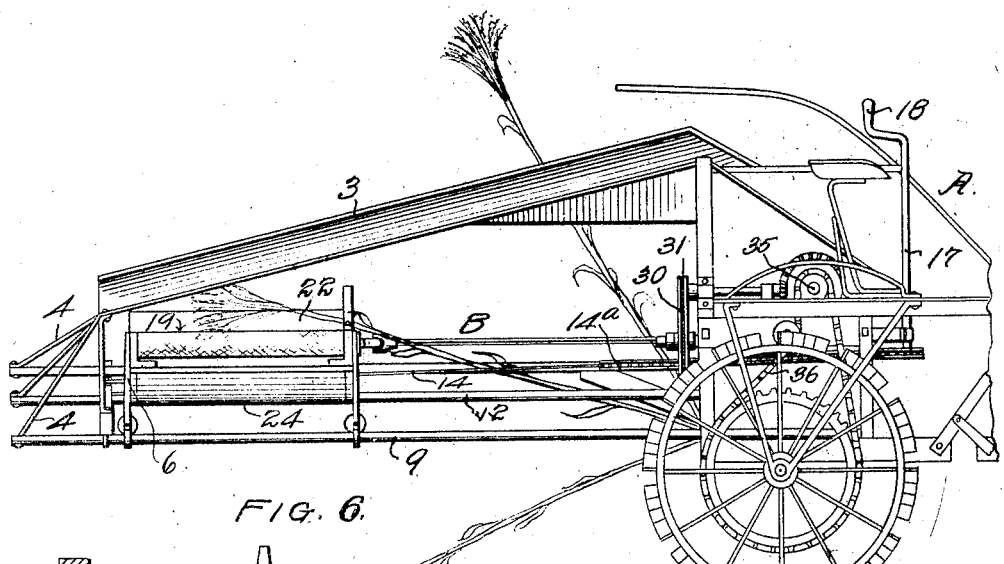
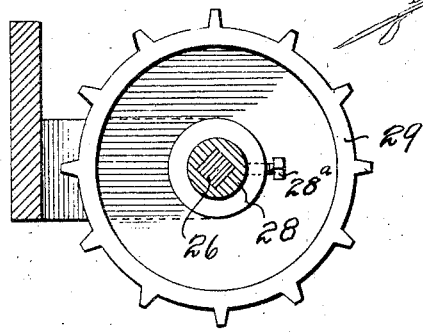
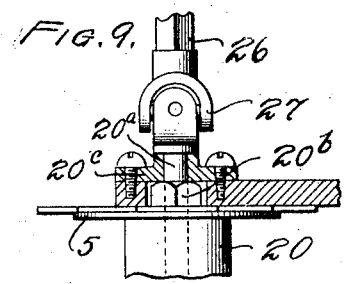
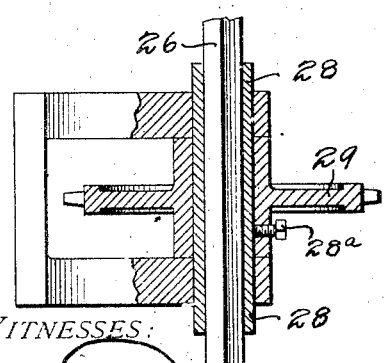
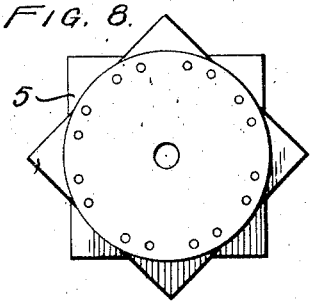

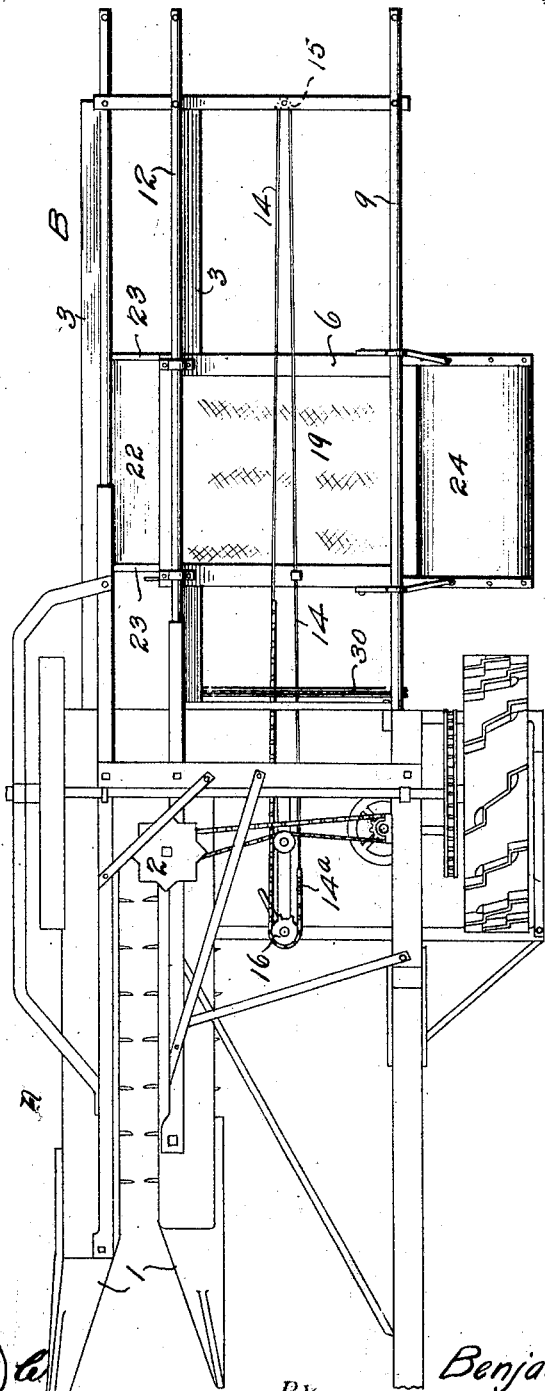

UNITED STATES PATENT OFFICE.

BENJAMIN TITUS, OF WELLVILLE, VIRGINIA.

BROOM-CORN HARVESTER.

1,034,044.  Specification of Letters Patent. Patented July 30, 1912.

Application filed January 3, 1912. Serial No. 669,194.

*To all whom it may concern:*

Be it known that I, BENJAMIN TITUS, a citizen of the United States, residing at Wellville, in the county of Nottoway and State of Virginia, have invented certain new and useful Improvements in Broom-Corn Harvesters, of which the following is a specification.

The present invention relates in general to harvesters, and more particularly to a machine which has been especially designed for the purpose of harvesting broom corn and cutting the tassels therefrom.

The object of the invention is to provide a machine for harvesting broom corn which is strong and durable in its construction, which can be readily adjusted for the various heights of broom corn found in different fields or in different parts of the same field, and which will operate in a positive and reliable manner both to cut off the stalk at the base thereof and to cut off the tassel at the upper end of the stalk, the tassels being collected on a shelf or similar member provided for that purpose.

A further object of the invention is to provide a machine of the character mentioned which can be operated by a single person and which is quick and effective in its action, thereby enabling a large amount of work to be accomplished in a comparatively short period of time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a broom corn harvester constructed in accordance with the invention. Fig. 2 is a side elevation of the same, showing the manner in which the broom corn is operated upon. Fig. 3 is a bottom plan view of a harvester constructed in accordance with the invention. Fig. 4 is a top plan view of the carriage upon which the mechanism is mounted for cutting the tassel from the upper end of the stalk and conveying the same to a shelf or suitable receptacle for collecting the tassels. Fig. 5 is a vertical sectional view through the carriage shown in Fig. 4, the main guide members being shown in section over one end of the carriage. Fig. 6 is a detail view of the gear wheel by means of which the cutter upon the carriage is driven. Fig. 7 is a sectional view through the said gear wheel. Fig. 8 is a view of the cutter upon the carriage, and Fig. 9 is a detail view of the universal joint between the cutter and the shaft by means of which it is driven.

Corresponding and like parts are referred to in the following description and indicated in all the views of the drawings by the same reference characters.

Referring to the drawings, upon which one possible embodiment of the invention is illustrated, the reference character A designates a corn harvester which is of the usual construction and need not be described in detail. This corn harvester is designed to be driven through the field so that the row of corn is received between the guide members 1 at one side thereof, a knife 2 being provided at the inner end of the guide members for severing the stalks of corn at the lower ends thereof. As the stalks of corn are thus severed, they fall rearwardly, as indicated by Fig. 2. It will be understood that this harvester A may be of any suitable construction.

Projecting rearward from the harvester A is a frame B upon which means is mounted for cutting the tassels from the upper ends of the stalks of broom corn and collecting the said tassels in such a manner that they can be very conveniently removed. Extending rearwardly from the upper ends of the guide members 1, are inclined guide strips 3 which serve to direct the broom corn as it falls rearwardly after having the lower end of the stalk severed by the knife 2. These guide strips 3 are inclined downwardly toward the rear end of the machine where they are secured to the frame B by suitable braces 4. By means of the guide strips 3 the broom corn is caused to fall in a proper and uniform manner upon the cutter 5 of a carriage 6, the said cutter serving to remove the tassel. The carriage 6 is movable longitudinally upon the frame B so as to be shifted rearwardly or forwardly with respect to the harvester A. One end of the carriage 6 is formed with a bracket 7 formed with a loop 8 loosely receiving a longitudinal guide rod 9. A roller 10 is journaled in the upper portion of the loop 8 and travels upon the rod 9 so as to reduce the friction and enable the carriage to be easily moved. In a somewhat similar manner, the opposite end of the carriage 6 is formed with a bracket 11 which receives a guide rod 12 and has a roller 13 journaled thereon, the said roller traveling upon the upper surface of the guide rod. The carriage is connected to an endless cable 14 which passes around a guide member or pulley 15 at the rear end of the frame B. At the forward end of the machine the cable 14 is formed with a chain portion 14$^a$ which extends around a toothed wheel 16 at the lower end of a vertical shaft 17. A handle 18 is applied to the upper end of this vertical shaft 17, and it will be obvious that by suitably turning this handle the carriage 6 can be moved back and forth upon the guide rods 9 and 12, as may be desired.

An endless conveyer belt 19 is mounted upon the carriage 6, the said conveyer belt passing around the rolls 20 and 21 at opposite ends of the carriage. The roller 20 is provided at the end thereof with the rotary cutter 5 which is designed to sever the tassels from the upper ends of the stalks as they fall through the main guide strips 3.

The end of the carriage 6 which is provided with the cutter 5 is provided with an inclined guide 22 adapted to deflect the tassels upon the conveyer belt 19. This inclined guide 22 may be mounted in any suitable manner, although in the present instance it is shown as secured to the brackets 23. The tassels which have been severed from the stalks and deflected upon the conveyer belt 19 by the inclined guide 22 are carried to the opposite end of the carriage 6 where they are deposited upon a shelf 24. Adapted to coöperate with the inclined guide 22 to direct the corn properly upon the rotary cutter 5 is a guide bracket 25 which is secured to the carriage 6 adjacent the cutter. The corn is thus caused to fall uniformly and accurately upon the cutter 5 so that the tassels are properly severed therefrom.

In order to accommodate the machine to different heights of corn which may be found in different parts of a field, it is merely necessary to move the carriage 6 back and forth as may be required.

A drive shaft 26 is connected by a universal joint 27 to the roller 20 of the carriage, the said drive shaft having a polygonal cross section sliding freely through a similar polygonal opening in a sleeve 28 applied to a gear wheel 29. The sleeve 28 is normally locked with the gear wheel by means of a set screw 28$^a$ which passes through the hub of the gear wheel. The gear wheel may be connected to the gearing of the harvester in any manner, and as the carriage 6 is moved back and forth, the angular shaft 26 slides freely through the sleeve 28, thereby enabling power to be continuously transmitted to the roller 20 for the purpose of operating both the cutter 5 and the conveyer belt 19.

In the operation of the device, the machine is designed to be driven through a field of broom corn in the same manner in which the harvester portion A would ordinarily be driven through a field of ordinary corn. The stalks of corn are cut by the knife 2 and the corn then caused to fall rearwardly so that the tassel portions thereof drop upon the guide 22 of the carriage and are deflected thereby toward the conveyer belt 19. The cutter 5 then severs the tassels from the body portion of the stalks, and the tassels are carried by the conveyer belt 19 to the shelf 24. The severed tassels are collected on this shelf, and may be removed from the shelf at convenient intervals of time.

General reference has been made to the fact that the drive shaft 26 has a universal joint connection 27 with one of the rolls 20 of the carriage having the conveyer belt 19, but in this connection a detail of practical importance resides in the feature of having the spindle end 20$^a$ with which the joint 27 is made, threaded so that there may be applied thereto a clamping nut 20$^b$ arranged in a recess in one side of the carriage frame and serving to clamp the knife 5 against one end of the roller 20 the parts being maintained very securely in this relation through the medium of an outer bearing plate 20$^c$ that is fastened to the frame of the carriage and constitutes a bearing for the portion of the spindle 20$^a$ beyond the nut 20$^b$. Furthermore, while, as stated, the gear wheel 29 may be connected to the gearing of the harvester in any suitable manner, yet a simple and practical method of accomplishing this drive connection is shown in the drawings and resides in employing a drive chain 30 which passes over the sprocket teeth on the wheel 29 and receives its motion from a pinion 31 on one end of a countershaft 32, the other end of which countershaft carries a beveled gear pinion 33 that meshes with a beveled gear drive wheel 34 carried on the main operating shaft 35 of the harvester mechanism, and which shaft 35 has a direct driving connection 36 with the main axle or ground wheel of the harvester, all of which plainly appears in the drawings. It should be further explained that the distinctive feature of the present invention is to provide a broom corn harvesting mechanism with a cutting and collecting attachment of the character described, whereby broom-corn stalks may be profitably harvested by machinery in the field, that is to say, whereby such stalks may not only be cut down from the ground, but the tassel ends thereof with the contiguous "boot," may be cut and collected in such condition as to permit the same to be handled by a subsequent machine which provides not only for threshing out the seed from the tassel, but also provides for removing the small sheath and leaf at the base of the tassel which is commonly known as the "boot" and this subsequent machine for thus removing the "boot" and threshing the tassel forms the subject matter of the related application filed January 3, 1912, Serial No. 669,195, and in this connection it should be further observed that inasmuch as any machine has not heretofore been provided for removing this "boot," it has been heretofore unprofitable to harvest standing broom-corn by the usual harvesting machinery. Instead of using such harvesting machinery, the common practice has been to simply cut by hand the tassel end from standing broom-corn in the field. Hence, the practical utility will be apparent for the novel combination of a harvester for broom-corn having means for cutting the stalks as they stand in the field and then for subsequently severing the tassel ends in preparation for the "booting" operation.

Having thus described the invention, what I claim as new and desire to secure by Letters Patent, is:—

1. A harvester for broom corn including means for cutting the stalks as they stand in the field, a conveyer attachment including cutting means occupying a fixed location for cutting off the tassel and boot ends of the stalks in substantially uniform lengths, and means for adjusting said conveyer means to adapt the same to varying lengths of stalks.

2. A harvester for broom-corn including means for cutting the stalks as they stand in the field, a carriage movably mounted upon the harvester, a conveyer on the carriage, a cutter upon the carriage occupying a fixed location at one corner of the conveyer, means for directing the stalks upon the cutter of the carriage as they fall after being operated upon by the first cutter, the said cutter on the carriage serving to sever the tassel ends of the stalks, and the conveyer upon the carriage receiving the tassel ends of the stalks as they are severed by the second cutter and carrying them away from the cutter, and means for moving the carriage to properly position the cutter thereon for acting upon tall and short corn.

3. A harvester for broom-corn including means for cutting the stalks as they stand in a field, a longitudinal guide rod upon the harvester, a carriage movably mounted upon the guide rod, a conveyer on the carriage, a cutter upon the carriage occupying a fixed location at one corner of the carriage, means for directing the stalks upon the second cutter as they fall after being operated upon by the first cutter, the said second cutter serving to sever the tassel ends of the stalk, and means for moving the carriage to properly position the second cutter so that it will operate upon corn of various heights.

4. A harvester for broom-corn including means for cutting the stalks as they stand in a field, a carriage movably mounted upon the harvester, a conveyer on the carriage, a cutter upon the carriage occupying a fixed location at one corner of the conveyer, guides upon the carriage for delivering stalks to the cutter thereon, means for directing the stalks upon the said guides after they have been operated upon by the first cutter, the said second cutter serving to sever the tassel ends of the corn, and means for moving the carriage to properly position the second cutter so that it will act upon both short and tall corn.

5. A harvester for broom-corn including means for cutting the stalks as they stand in a field, a carriage movably mounted upon the harvester, a conveyer on the carriage, a rotary cutter upon the carriage occupying a fixed location at one corner of the conveyer, means for directing the corn upon the rotary cutter after it has been acted upon by the first mentioned cutter, the said rotary cutter serving to remove the tassel ends of the corn, means for moving the carriage to properly position the rotary cutter for acting upon tall and short corn, a gear wheel upon the harvester, and a shaft connected to the rotary cutter and formed with an angular portion which slides through the gear wheel as the carriage is moved back and forth but is rotated thereby.

6. A harvester for broom corn including means for cutting the stalks as they stand in the field, a movably mounted carriage, a cutter occupying a fixed location upon the carriage, guide means for directing the stalks upon the cutter of the carriage as they fall after being acted upon by the first cutter, the said cutter of the carriage serving to sever the tassel ends of the stalks, and adjustment means for moving the carriage to position the cutter so that it will act properly upon various lengths of stalks.

7. A harvester for broom corn including means for cutting the stalks as they stand in a field, a movably mounted carriage, a cutter occupying a fixed location mounted upon the carriage, means for directing the stalks upon the cutter of the carriage as they fall after being operated upon by the first cutter, the said cutter of the carriage serving to remove the tassel ends of the stalks, and adjustment means upon the carriage for collecting the said tassel ends of the stalks.

8. A harvester for broom corn including means for cutting the stalks as they stand in a field, a carriage movably mounted upon the harvester, a second cutter upon the carriage, means for directing the stalks upon the second cutter as they fall after being acted upon by the first cutter, the said second cutter serving to remove the tassel ends of the stalks, a shelf upon the carriage, a conveyer upon the carriage for receiving the severed tassel ends and delivering them to the shelf, and means for moving the carriage to properly position the cutter thereon for tall and short corn.

9. A harvester for broom corn including means for cutting the stalks as they stand in a field, a carriage movably mounted upon the harvester, a pair of rollers upon the carriage, an endless conveyer belt passing over the rollers, a rotary cutter rigid with one of the rollers, means for directing the stalks upon the rotary cutter as they fall after being operated upon by the first mentioned cutter, the said rotary cutter serving to sever the tassel ends of the stalks, and means for moving the carriage to properly position the rotary cutter so that it will act upon tall and short corn, the conveyer belt serving to convey the severed tassel ends away from the rotary cutter.

10. A harvester for broom corn including means for cutting the stalks as they stand in a field, a carriage movably mounted upon the harvester, a pair of rolls upon the carriage, an endless conveyer belt passing around the rolls, a rotary cutter rigid with one of the rolls, means for directing the stalks upon the rotary cutter after they have been acted upon by the first mentioned cutter, the said rotary cutter serving to sever the tassel ends and the conveyer belt carrying the tassel ends away from the rotary cutter, means for moving the carriage to properly position the rotary cutter for acting upon tall and short corn, a gear wheel upon the harvester, and a shaft connected to the rotary cutter and roll and having an angular portion which slides through the gear wheel of the harvester as the carriage is moved back and forth but rotates with the gear wheel so as to drive both the cutter and the conveyer belt.

In testimony whereof I hereunto affix my signature in the presence of two witnesses.

BENJAMIN TITUS.

Witnesses:
CHARLES TITUS,
AMELIA TITUS.